(12) United States Patent
Lee et al.

(10) Patent No.: US 11,711,697 B2
(45) Date of Patent: Jul. 25, 2023

(54) ELECTRONIC DEVICE AND CONTROL METHOD THEREOF

(71) Applicant: SAMSUNG ELECTRONICS CO., LTD., Suwon-si (KR)

(72) Inventors: Dongik Lee, Suwon-si (KR); Chungyong Eom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 786 days.

(21) Appl. No.: 16/668,470

(22) Filed: Oct. 30, 2019

(65) Prior Publication Data

US 2020/0178067 A1 Jun. 4, 2020

(30) Foreign Application Priority Data

Nov. 29, 2018 (KR) .................. 10-2018-0150340

(51) Int. Cl.

| *H04L 29/06* | (2006.01) |
|---|---|
| *H04W 12/50* | (2021.01) |
| *H04B 17/27* | (2015.01) |
| *H04W 4/02* | (2018.01) |
| *H04L 9/40* | (2022.01) |
| *H04L 9/08* | (2006.01) |

(Continued)

(52) U.S. Cl.
CPC ............ *H04W 12/50* (2021.01); *H04B 17/27* (2015.01); *H04L 9/0875* (2013.01); *H04L 63/0442* (2013.01); *H04M 1/72412* (2021.01); *H04W 4/023* (2013.01); *H04W 52/0245* (2013.01); *H04L 2209/80* (2013.01)

(58) Field of Classification Search
CPC . H04W 12/50; H04W 52/0245; H04W 4/023; H04B 17/27; H04L 2209/80; H04L 63/0442; H04L 9/0875
USPC .......................................................... 380/270
See application file for complete search history.

(56) References Cited

U.S. PATENT DOCUMENTS

| 7,509,131 B2 | 3/2009 | Krumm et al. |
| 9,125,140 B2 | 9/2015 | Maniatopoulos et al. |

(Continued)

FOREIGN PATENT DOCUMENTS

| CN | 107431923 A | 12/2017 |
| KR | 10-2014-0118111 | 10/2014 |

(Continued)

OTHER PUBLICATIONS

Search Report and Written Opinion dated Feb. 14, 2020 in counterpart International Application No. PCT/KR2019/014374.

(Continued)

*Primary Examiner* — Evans Desrosiers
(74) *Attorney, Agent, or Firm* — Nixon & Vanderhye P.C.

(57) ABSTRACT

Disclosed is an electronic device. The electronic device includes a communicator comprising communication circuitry and a processor, the processor is configured to control the communicator to perform communication with an external device based on identifying that a strength of a signal received from an external device is equal to or greater than a predetermined threshold value, and after converting an electronic device to a low power mode, based on identifying that a strength of a signal received from an external device being within a first range, to control the electronic device to perform a secure pairing operation.

20 Claims, 7 Drawing Sheets

(51) Int. Cl.
*H04W 52/02* (2009.01)
*H04M 1/72412* (2021.01)

(56) References Cited

U.S. PATENT DOCUMENTS

| | | |
|---|---|---|
| 9,445,032 B2 | 9/2016 | Muth |
| 9,560,472 B2 | 1/2017 | Lee |
| 10,009,713 B2 | 6/2018 | Linde et al. |
| 10,129,272 B2 | 11/2018 | Lee et al. |
| 10,477,389 B2 | 11/2019 | Lee et al. |
| 2010/0080134 A1 | 4/2010 | Maniatopoulos et al. |
| 2012/0106527 A1 | 5/2012 | Ichikawa et al. |
| 2013/0229930 A1* | 9/2013 | Akay ............... H04W 12/64 370/252 |
| 2014/0295763 A1 | 10/2014 | Lee |
| 2014/0380419 A1 | 12/2014 | Peluso et al. |
| 2015/0271432 A1 | 9/2015 | Muth |
| 2015/0282088 A1 | 10/2015 | Weizman et al. |
| 2017/0019412 A1 | 1/2017 | Castro et al. |
| 2017/0078881 A1 | 3/2017 | Lee et al. |
| 2017/0150533 A1* | 5/2017 | Alipour ............... H04W 76/10 |
| 2018/0176879 A1 | 6/2018 | Yoon |
| 2018/0338330 A1 | 11/2018 | Ledvina et al. |

FOREIGN PATENT DOCUMENTS

| | | |
|---|---|---|
| KR | 10-1473503 B1 | 12/2014 |
| KR | 10-2017-0014479 | 2/2017 |
| KR | 10-2017-0031552 | 3/2017 |
| KR | 10-2018-0070303 | 6/2018 |

OTHER PUBLICATIONS

Extended European Search Report dated Aug. 13, 2021 in corresponding European Application No. 19891238.8.
Chinese Office Action dated Jan. 19, 2023 for CN Application No. 201911188731.2.
Korean Office Action dated Apr. 13, 2023 for KR Application No. 10-2018-0150340.

\* cited by examiner

ELECTRONIC DEVICE AND CONTROL METHOD THEREOF

CROSS-REFERENCE TO RELATED APPLICATION

This application is based on and claims priority under 35 U.S.C. § 119 to Korean patent application number 10-2018-0150340, filed on Nov. 29, 2018, in the Korean Intellectual Property Office, the disclosure of which is incorporated by reference herein in its entirety.

BACKGROUND

1. Field

This disclosure relates to an electronic device and a control method thereof performing secure pairing based on a strength of a signal.

2. Description of Related Art

In order to control an external device applicable with internet of things through user terminal device, such as a smart phone, remotely, a process of pairing the terminal device with the external device is necessary.

Traditionally, a terminal device would detect for nearby devices for the pairings, and a user may be required to perform a separate operation of having to identify the device for pairing from among the detected devices and press a button. In this case, based on detecting a plurality of devices, problems such as a user selecting pairing with a different device by confusing the device to be paired or may perform an unwanted pairing due to similar devices being detected.

In addition, such pairing process is vulnerable to external attacks and security problems may arise.

SUMMARY

Embodiments of the disclosure provide an electronic device and a control method thereof performing a simple pairing operation with an external device based on a strength of a signal.

According to an example embodiment of the disclosure, an electronic device includes a communicator comprising communication circuitry and a processor, the processor, based on identifying that a strength of a signal received from and an external device is equal to or greater than a predetermined threshold value, is configured to control the communicator to perform communication with the external device, and after converting the electronic device to a low power mode, based on identifying that a strength of a signal received from the external device falls within a first range, to control the electronic device to perform a secure pairing operation.

The processor, based on receiving a strength of a signal including a first parameter used in a public key encryption from the external device through the communicator, may control the electronic device to transmit a response signal including a second parameter to the external device.

In addition, the processor, based on identifying that a strength of a signal of the request signal falls within the first parameter, may control the electronic device to perform the secure pairing operation based on the first parameter and the second parameter.

The processor may control the electronic device to perform the secure pairing operation based on a first secure key generated based on the first parameter and the second parameter and a second secure key generated by the external device.

The second secure key, based on identifying that a strength of a signal of the response signal received from the external device falls within the first range, may be generated based on the first parameter and the second parameter.

The processor, based on a strength of a signal received from the external device falling within a second range and identifying that the strength of the signal is equal to or greater than the predetermined threshold value at a particular point-of-time, may control the communicator to perform communication with the external device at a corresponding point-of-time.

The first range is determined based on a degradation range of signal strength by the second range and the low power mode.

The external device may include a software access point (AP).

The processor, based on identifying that a strength of a Wi-Fi signal received from the external device is equal to or greater than the predetermined threshold value, may control the communicator to perform a Wi-Fi communication with the software AP.

The external device may include a software access point (AP).

The processor, based on identifying that a strength of a Wi-Fi signal received from the external device is equal to or greater than the predetermined threshold value, may control the communicator to perform a Wi-Fi communication with the software AP.

The electronic device may further include a display.

The processor, based on the electronic device being within a specified proximity of the external device and after tagging the electronic device to the external device, may control the display to provide a guide UI guiding the electronic device to separate from the external device.

The electronic device may be a mobile device, and the external device may be a fixed device.

The predetermined threshold value may be −10 dBm.

The first range may be within 0-80 dB range.

According to an example embodiment of the present disclosure, an electronic system includes a first electronic device, based on identifying that a strength of a signal received from a second electronic device is equal to or greater than a predetermined threshold value, is configured to perform communication with the second electronic device, and based on identifying that a strength of a signal received from the second electronic device after converting to a low power mode falls within a first range, is configured to perform a secure pairing operation, and a second electronic device, based on performing communication with the first electronic device and identifying that a strength of a signal received from the first electronic device falls within the first range, is configured to perform a secure pairing operation.

The first electronic device, based on receiving a request signal including a first parameter from the second electronic device, may transmit a response signal including a second parameter to the second electronic device, and based on identifying that a strength of a signal of the request signal falls within a first range, may generate a first secure key based on the first parameter and the second parameter.

The second electronic device, based on receiving a response signal including the second parameter from the first electronic device and identifying that a strength of a signal of the response signal falls within the first range, may generate a second secure key based on the first parameter and the second parameter, and the respective first and second electronic devices may perform the secure pairing operation based on the first secure key and the second secure key.

According to an example embodiment of the present disclosure, a method of controlling an electronic device includes, based on identifying that a strength of a signal received from an external device is equal to or greater than a predetermined threshold value, performing communication with the external device and after converting the electronic device to a low power mode, based on identifying that a strength of a signal received from the external device falls within a first range, and performing a secure pairing operation.

The performing the secure pairing operation may include transmitting, based on receiving a request signal including a first parameter used in a public key encryption from the external device, a response signal including a second parameter to the external device, and based on identifying that a strength of a signal of the request signal falls within the first range, performing the secure pairing operation based on the first parameter and the second parameter.

The performing of the secure pairing operation may include performing the secure pairing operation based on a first secure key generated based on the first parameter and the second parameter and a second secure key generated from the external device.

The second secure key, based on identifying that a strength of a signal of the response signal received from the external device falls within the first range, may be generated based on the first parameter and the second parameter.

The performing the communication, based on a strength of a signal received from the external device falling within a second range and identifying that the strength of the signal is equal to or greater than the predetermined threshold value at a particular point of time, may include performing communication with the external device at a corresponding point of time.

The first range may be determined based on a degradation range of signal strength by the second range and the low power mode.

The external device may include a software access point (AP), and the performing the communication, based on identifying that a strength of a Wi-Fi signal received from the external device is equal to or greater than the predetermined threshold value, may include performing a Wi-Fi communication with the software AP.

The method may further include providing a guide UI, based on the electronic device being within a specified proximity with the external device and after tagging the electronic device to the external device, guiding the electronic device to separate from the external device.

The electronic device may be a mobile device, and the external device may be a fixed device.

The predetermined threshold value may be −10 dBm, and the first range may be within 0-80 dB range.

According to various example embodiments of the present disclosure as described above, external devices may be detected through an electronic device, and a pairing operation with an external device may be performed simply by selecting an external device for pairing and without having to perform a certification process such as inputting PIN code.

Further, costs may be saved since a pairing operation may be performed with an external device without having to add a separate hardware and simply through a software.

Further, a pairing operation may be performed safely with an external device by identifying whether there is an outside intruder.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
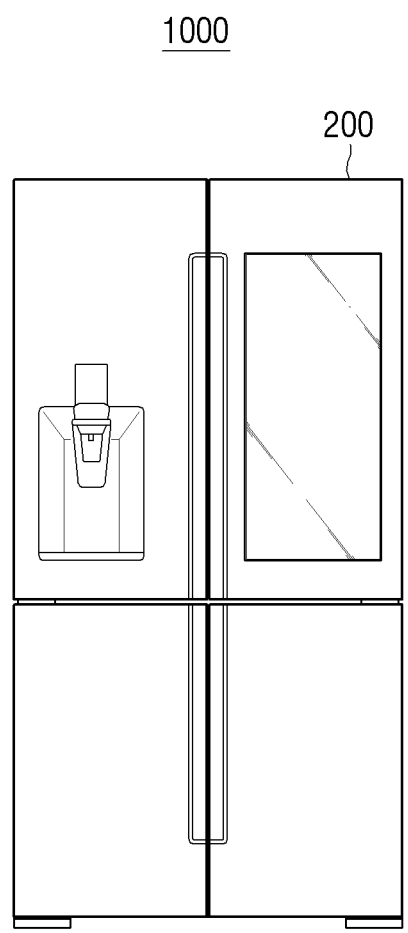
FIG. 1 is a diagram illustrating an example electronic system according to an example embodiment of the present disclosure.
Figure 1:
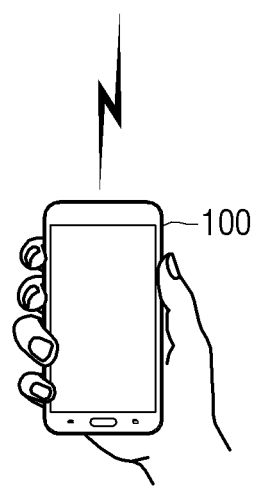

The disclosure will be explained in greater detail below with reference to the attached drawings.

The terms used in the disclosure will be briefly described, and the disclosure will be explained in detail.

The terms used in the disclosure have been selected from general terms currently widely used in consideration of the functions in the various example embodiments of the disclosure, but may be changed according to the intention of those skilled in the related art or precedent, emergence of new technologies, and the like. The disclosure may use arbitrarily selected terms, and the meanings thereof will be disclosed in detail in the descriptions relevant to the disclosure. Accordingly, terms used in the disclosure are not simply understood by the term, but are defined based on the meaning of the term and the context throughout the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not intended to limit the scope of the disclosure to a specific embodiment, but should be interpreted to include all modifications, equivalents or alternatives of the embodiments included in the ideas and the technical scope of the disclosure as set forth herein. In case it is determined that in describing embodiments, detailed description of related known technologies may unnecessarily confuse the gist of the disclosure, the detailed description may be omitted.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The expression at least one from A and/or B is to be understood as indicating at least one of "A" or "B" or "A and B".

Expressions such as "first" or "second" used in the disclosure may be used to identify various elements regardless of order and/or importance, and may be used merely to differentiate one element from another but the relevant elements should not be limited thereto.

Based on an element (for example, first element) being indicated as being "coupled (operatively or communicatively) to" another element (for example, second element) or "connected to", it is to be understood that a certain element may be directly coupled to another element or may be coupled through another element (for example, third element).

The term such as "module" or "unit" may be used to refer to an element that performs at least one function or operation, and such element may be implemented as hardware or software, or a combination of hardware and software. Further, except for when each of a plurality of "modules" or "units" needs to be realized in a particular hardware, the components may be integrated in at least one module and be realized in at least one processor (not shown). In the disclosure, the term "user" may refer to a person using an electronic device or a device (example: electronic device with artificial intelligence) using an electronic device.

Example embodiments of the disclosure will be described in detail with reference to the accompanying drawings to aid in the understanding of those of ordinary skill in the art to. However, the disclosure may be realized in various different forms and it should be noted that the disclosure is not limited to the various example embodiments described herein. Further, in the drawings, parts not relevant to the description may be omitted, and like reference numerals may be used to indicate like elements.

Example embodiments of the disclosure will be described in greater detail below with reference to the attached drawings.

FIG. 1 is a diagram illustrating an example electronic system according to an example embodiment of the present disclosure.

An electronic system 1000 includes an electronic device 100 and another electronic device 200. The electronic device 100 and the another electronic device 200 are devices capable of performing a paring operation. According to an embodiment, the electronic device 100 may, for example, include a mobile electronic device, such as, for example, and without limitation, a smartphone.

The another electronic device 200 may be a device capable of performing a pairing operation with the electronic device 100. According to an embodiment, the another electronic device 200 may, for example, be a device that includes software access point (AP). For example, the another electronic device 200 may be a device capable of performing software access point (AP) function. Software access point (AP) function may refer, for example, to a wireless LAN client but may be a function that realizes the role of the wireless access point as a software and may operate as a wireless AP. For example, the another electronic device 200 may, for example, and without limitation, realize tethering, mobile hotspot, Wi-Fi direct, or the like through the software AP function. The another electronic device 200 may be realized in various forms such as, for example, and without limitation, a TV, an air conditioner, a refrigerator, a dryer, an air purifier, a humidifier, a vacuum, a microwave, a washer, a set-top box, an audio, a digital video disk (DVD) player and the like.

In order for the electronic device 100 to remotely control the another electronic device 200 or to realize an Internet of Things (IoT) service, a pairing operation between the electronic device 100 and the another electronic device 200 must typically be performed. Typically, a user would detect the another electronic device 200 nearby through the electronic device 100, select the desired device from a list of another electronic devices 200 detected and perform a pairing operation, and would have to undergo a separate certification process such as inputting a PIN code during this process. However, according to the various example embodiments of the present disclosure, based on the electronic device 100 being in close proximity (e.g., within a specified proximity) with the another electronic device 200 or the electronic device 100 being tagged to the another electronic device 200, and the electronic device 100 being separated from the another electronic device 200 thereafter, both devices may be paired without a separate operation based on a strength of a signal between both devices. In the following description, various example embodiments of the disclosure will be described in greater detail with reference to the attached drawings.

Figure 2:
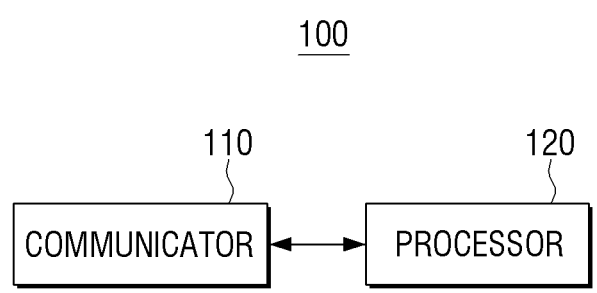
FIG. 2 is a block diagram illustrating an example configuration of an example electronic device according to an example embodiment of the present disclosure.

FIG. 2 is a block diagram illustrating an example configuration of an example electronic device according to an example embodiment of the present disclosure.

Referring to FIG. 2, the electronic device 100 includes a communicator (e.g., including communication circuitry) 110 and a processor (e.g., including processing circuitry) 120.

The communicator 110 may include various communication circuitry and may be configured to transmit and receive data with the external device 200. The external device 200 may be another electronic device that may include, for example, the software AP.

For example, the communicator 110 is configured to transmit data to the external device 200 according to a wireless communication method. For example, the communicator 110 may perform communication with external device 200 according to a wired/wireless communication method, and may include various communication circuitry using various communication methods such as, for example, and without limitation, a BlueTooth (BT), Wireless Fidelity (Wi-Fi), Zigbee, Infrared (IR), Serial Interface, Universal Serial Bus (USB), Near Field Communication (NFC), Vehicle to Everything (V2X), mobile communication (Cellular), and the like.

In addition, the communicator 110 may receive a request signal including a first parameter used in a public key decryption from an external device 200 under, for example, control of the processor 120, and may transmit a response signal including a second parameter. A more detailed description of the above will be provided below.

The processor 120 may include various processing circuitry and may control the overall operation of the electronic device 100.

According to an embodiment of the disclosure, the processor 120 may include various processing circuitry, such as, for example, and without limitation, at least one of a digital signal processor (DSP), a microprocessor, a time controller (TCON) that processes a digital signal, or the like. However, the processor is not limited thereto, and may include, for example, and without limitation, one or more of a central processing unit (CPU), a micro controller unit (MCU), a micro processing unit (MPU), a controller, an application processor (AP), a communication processor (CP), an ARM processor, or the like. Further, the processor 120 may be realized as System on Chip (SoC) or large scale integration (LSI) embedded with a processing algorithm, and may be realized in the form of Field Programmable gate array (FPGA). The processor 120 may perform various functions by executing computer executable instructions stored in a storing unit or memory (not shown).

According to an embodiment, the processor 120, based on identifying that a strength of a signal received from the external device 200 is equal to or greater than a predetermined threshold value, may control the communicator 110 to perform communication with the external device 200. The communication performed by the electronic device 100 and the external device 200 may, for example, be a temporary communication performed before the secure pairing, and may be a trigger operation to perform a secure pairing. The secure pairing may refer, for example, to a pairing of a high security level obtained through a particular certification process such as, for example, and without limitation, using a public key decryption method.

The processor 120 may acquire a strength of a signal received from the external device 200 as a received signal strength indication (RSSI) value. For example, the processor 120 may acquire a RSSI value of a signal sent from the software AP included in the external device 200.

The processor 120, based on identifying that a strength of a signal received from an external device 200 is equal to or greater than a predetermined threshold value, may identify the electronic device 100 as being tagged by the external device 200 or the electronic device 100 and the external device 200 that is positioned in a relative close proximity to be in a state just before tagging. For example, the predetermined threshold value may be −10 dBm. Accordingly, based on the strength of the signal received from the external device 200 reaching −10 dBm, the processor 120 may control the electronic device to perform communication with the external device 200. The value related to the predetermined threshold value includes a predetermined error range and may be one example, and the disclosure is not limited thereto. Thereafter, the external device 200 may also measure the strength of the signal sent from the electronic device 100.

For example, a Wi-Fi communication method between the electronic device 100 and external device 200 may be assumed. The processor 120, based on identifying that a strength of a Wi-Fi signal received from the external device 200 is equal to or greater than a predetermined threshold value, may control the communicator 110 to perform a Wi-Fi communication with a software AP of the external device 200.

The processor 120, after converting the electronic device 100 to a low power mode, based on identifying that a strength of a signal received the external device 200 falls within a first range, may perform a secure pairing operation. With the electronic device 100 converted to the low power mode, a strength of a signal may be reduced to a predetermined size. For example, with the electronic device 100 converted to a low power mode, the strength of the signal may be reduced by 40 dB.

Based on separating the electronic device 100 from the external device 200 by a predetermined distance, the strength of the signal received from the external device 200 may be reduced. For example, the predetermined distance may be 1 m. For example, based on separating the electronic device 100 from the external device 200 by the predetermined distance of 1 m, the strength of the signal received from the external device 200 may be reduced by 40 dB. The processor 120 may provide a guide UI through a display (not shown) to separate the electronic device 100 from the external device 200, which will be described in greater detail below. For example, the processor 120 may perform a secure pairing with the external device 200 based on changes in signal strength in cases such as the electronic device 100 not only being within a specified proximity to the external device 200 but also being separated from the external device 200.

The first range may be a range of a strength of a signal in a low power section and a section where the electronic device 100 is separated from the external device 200. For example, the strength of the signal may be reduced by 40 dB due to the electronic device 100 being converted to a low power mode, and the strength of the signal may be reduced by 40 dB due to the electronic device 100 being separated from the external device 200 by a predetermined distance.

The processor 120 may identify whether a strength of a signal falls within a first range based on at least one of a size of the signal strength changing or a trend of a signal changing. The trend of the signal changing may refer, for example, to whether the strength of the signal has rapidly changed. For example, based on the electronic device 100 being separated from the external device 200, the strength of the signal may be identified as falling within the first range when in a rapidly reducing Logarithm (Log) form.

The processor 120 may bring the electronic device 100 into proximity with the external device 200 and after tagging the electronic device 100 to the external device 200, may control a display (not shown) to provide a guide UI guiding the electronic device 100 to separate from the external device 200.

The guide UI will be described in greater detail below with reference to FIG. 5.

Figures 5A, 5B:
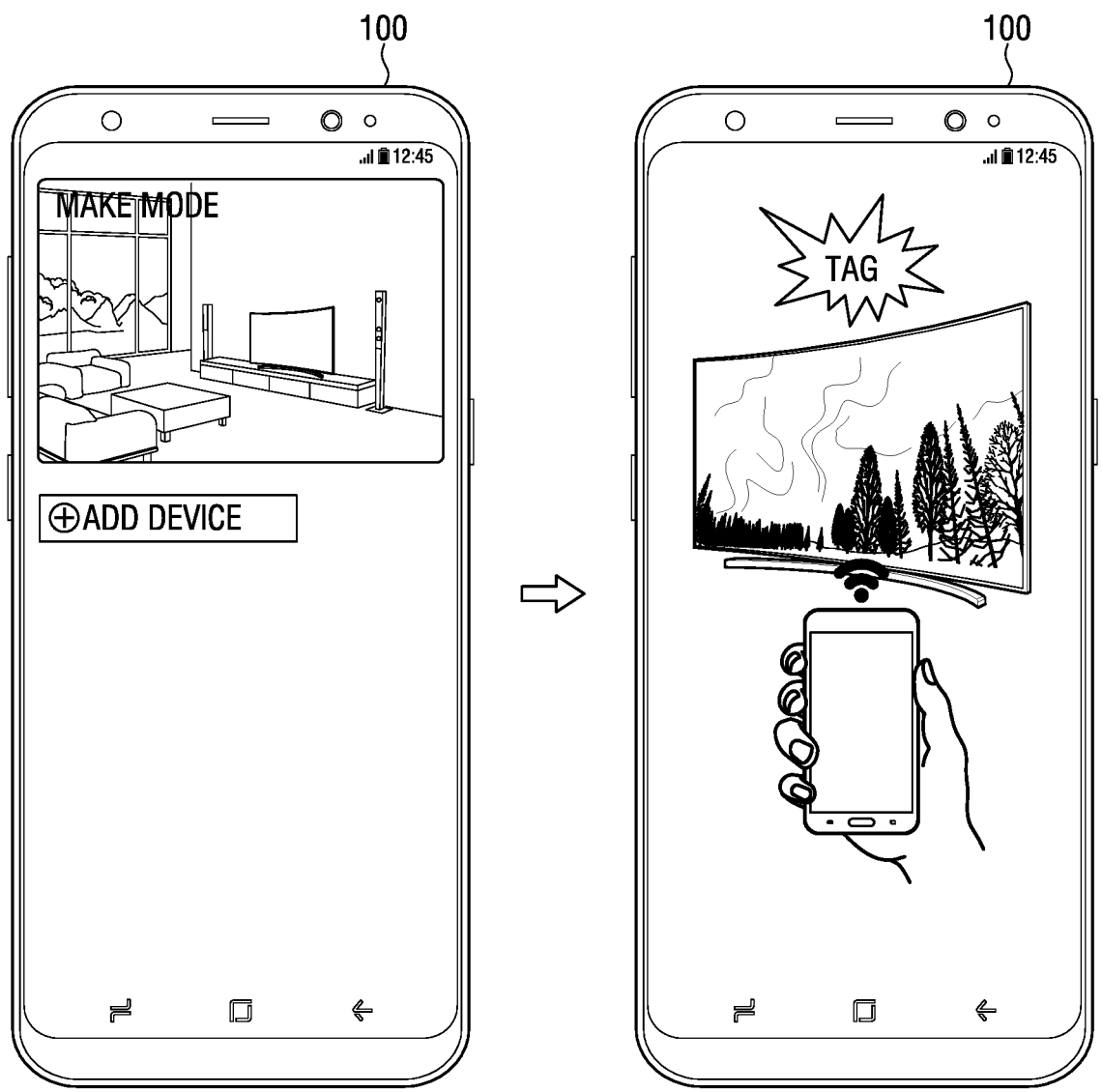
FIGS. 5A and 5B are diagrams illustrating an example guide UI guiding a movement of an electronic device according to an example embodiment of the present disclosure.

FIGS. 5A and 5B are diagrams illustrating an example guide UI guiding a movement of an electronic device according to an example embodiment of the present disclosure.

According to FIG. 5A, the processor 120 may provide a UI to perform pairing with devices nearby the electronic device 100 through a display (not shown). For example, the processor 120, in order to pair with the external device 200, for example, to register the external device 200, may provide a category titled "Add Device" to register the external device 200. Based on the "Add Device" category being chosen, the processor 120 may provide a guide UI guiding the movement of the electronic device 100.

According to FIG. 5B, the processor 120 may provide a UI to tag the electronic device 100 to a predetermined region (a position where an antenna is shown) of a TV, that is, to bring the electronic device 100 into proximity with a predetermined region of the TV. The processor 120, based on identifying that the strength of the signal received from the TV is equal to or greater than a predetermined threshold value, may then provide a guide UI guiding the electronic device 100 to separate from the TV by a predetermined distance. For example, the processor 120 may provide a video image of the electronic device 100 moving away from the TV by 1 m. FIGS. 5A and 5B show the external device 200 as a TV, but the disclosure is not limited thereto.

According to the guide UI provided in the display (not shown), the user may easily bring the electronic device 100 into proximity with the external device 200 or separate the electronic device 100 from the external device 200. The processor 120 may obtain the strength of the signal according to movement of the electronic device 100, and may identify whether the source of the signal strength received based on changes in signal strength is an outside attacker. For example, based on the electronic device 100 being separated from the external device 200, the processor 120 may identify whether the received signal strength falls within the first range. The processor 120, based on identifying that the received signal strength falls within the first range, may identify the external device 200 transmitting the signal as a legitimate device and not an outside attacker and perform a secure pairing. The long-distance outside attacker, based on the strength of the signal reducing according to the low power mode and the electronic device 100 being separated from the external device 200, may find it difficult to imitate changes in signal strength where the strength of the signal is reduced, that is, falls within the first range.

Referring back to FIG. 2, according to an embodiment, the processor 120 may perform temporary communication with the external device 200 as the strength of the signal received from the external device 200 is identified as being equal to or greater than a predetermined threshold value, and based on receiving a request signal from the external device 200 while the temporary communication is being performed, may control the communicator 110 to transmit a response signal to the external device 200 and may exchange a parameter used in a public key encryption. For example, the processor 120, based on receiving a request signal including a first parameter used in a public key encryption from the external device 200 through the communicator 110, may transmit a response signal including a second parameter to the external device 200 through the communicator 110. The second parameter may be a parameter generated from the processor 120, and the first parameter may be a parameter generated from the external device 200

The processor 120, based on identifying that a strength of a signal of a request signal falls within the first range, may perform a secure pairing operation based on a first parameter and a second parameter. For example, the processor 120 may generate a first secure key based on the first parameter and the second parameter.

For example, assuming that the first parameter is $g^x$ and the second parameter is $g^y$, the processor 120 may combine the received first parameter to the second parameter to generate a first secure key as $(g^x)^y$.

The second secure key, based on identifying that a strength of a signal received from the external device 200 falls within the first range, may be generated based on the first parameter and the second parameter. For example, the external device 200 may combine the first parameter to the second parameter and may generate a second secure key as $(g^y)^x$. Meanwhile, the first secure key and the second secure key is the same key, and may be a symmetric key. For example, the first secure key and the second secure key is the same key as $g^{xy}$.

The electronic device 100 and the external device 200 may respectively generate a secure key based on the received signal strength, and generate the secure key considering not only the electronic device 100 but also the strength of the signal. In other words, the external device 200 also performs a same operation as the electronic device 100 to perform a secure pairing operation. Accordingly, the electronic device 100 and the external device 200 may perform a pairing operation of a high security level through a two-way secure pairing.

The encryption method may, for example, include a symmetric encryption method that uses a same key in an encryption side encrypting data and a decryption side decrypting data and an asymmetric encryption method using different keys in the encryption side encrypting data and the decryption side. A public key encryption method using the parameter described above may correspond to the asymmetric encryption method. The public key encryption method using the parameter described above may correspond to the asymmetric encryption method. A public key method may, for example, be a method that requires two different keys, for example, a public key and a secret key capable of decrypting encrypted data by the public key, and while a level of security is relatively high, the rate of data exchange is slower compared to the symmetric encryption method. On the other hand, although the symmetric encryption method has a relatively low level of security, the rate of data exchange is faster compared to the asymmetric encryption method.

An example embodiment of the present disclosure exchanges a parameter capable of generating a first secure key and a second secure key through a public key encryption method of a high level of security, and may then exchange data quickly through the asymmetric encryption method based on the first secure key and the second secure key generated.

The processor 120 may perform a secure pairing operation based on the first secure key and the second secure key generated from the external device 200.

The processor 120, based on a strength of a signal received from the external device falling within a second range and identifying that the strength of the signal is equal to or greater than the predetermined threshold value at a particular point of time, may control the communicator to perform communication with the external device 200 at a particular point of time. For example, the processor 120 may not only identify whether the strength of the signal received from the external device 200 is equal to or greater than the predetermined threshold but also whether the strength of the signal received from the external device 200 falls with the second range. Based on satisfying the two conditions, the processor 120 may control the electronic device 100 to perform communication with the external device 200. The communication may refer, for example, to a temporary communication.

The processor 120 may identify whether the strength of the signal falls within the second range based on at least one of a size of the signal strength changing or a trend of a signal changing. The trend of a signal changing may refer, for example, to when the electronic device 100 is in proximity with the external device 200, identifying as falling within the second range when the strength of the signal is in a rapidly increasing Logarithm (Log) form. Further, the size of the signal strength may be, for example within a 40 dB range, but may include a predetermined error range.

The processor 120, based on the received signal strength, may identify whether the source of the received signal is an outside attacker. For example, based on the received signal strength not falling within the first range, the processor 120 may not perform a secure pairing operation with the relevant external device.

The processor 120 based on the electronic device 100 being in proximity with or being tagged by the external device 200 and the electronic device 100 being separated from the external device 200, may perform a secure pairing operation with the external device 200 based on changes in the strength of the signal. The changes in signal strength will be described in greater detail below with reference to FIG. 4.

Figure 4:
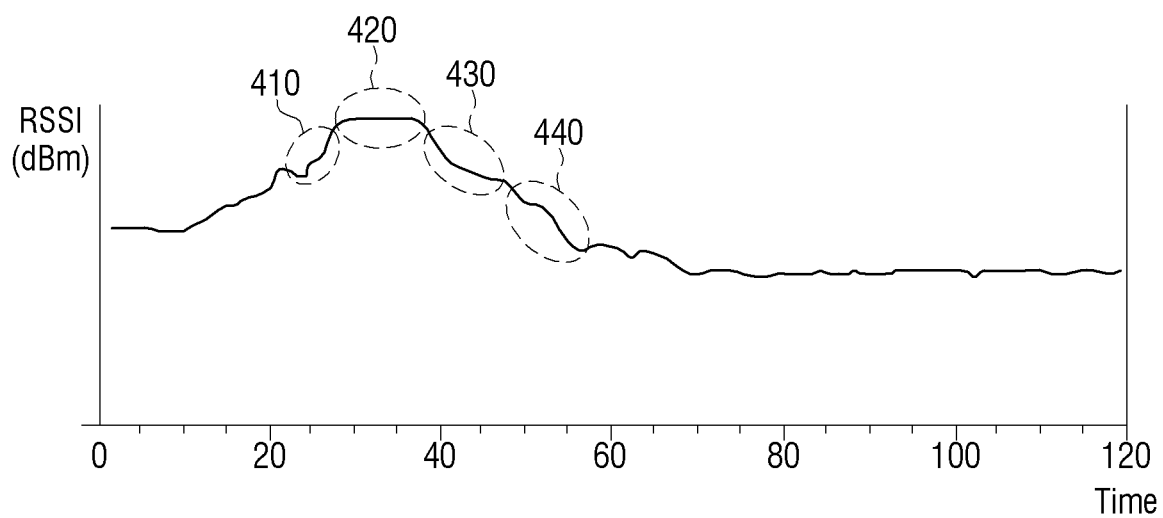
FIG. 4 is a diagram illustrating example changes in signal strength according to an example embodiment of the present disclosure.

FIG. 4 is a diagram illustrating example changes in signal strength according to an example embodiment of the present disclosure.

For example, FIG. 4 is a diagram showing the strength of the signal received from the external device 200 in the case of the electronic device 100 being in proximity with or tagging the external device 200 and being separated thereafter.

FIG. 4 is divided into a first section 410 showing the electronic device 100 approaching the external device 200 based on the order of time the electronic device 100 is in movement, a second section 420 showing the electronic device 100 in a state of being tagged or just before being tagged by the external device 200 in which the electronic device 100 and the external device 200 are placed in a state of relatively close proximity, a third section 430 showing the electronic device 100 being converted to a low power mode, and a fourth section showing the electronic device 100 being separated from the external device 200.

The processor 120 may identify whether the strength of the signal in the first section falls within the second range. The space in which electronic device 100 approaches the external device 200 is a free space from air, which may generate path loss. For example, the strength of the signal received from the electronic device 100 may be a strength that reflects path loss.

Path loss may refer, for example, to loss of electromagnetic wave signal generated based on communication in a free space. An equation for calculating path loss in as follows:

$$PL(dB) = 20\log_{10}\left(\frac{4\pi df}{c}\right)$$ [Equation 1]

wherein, PL is path loss, d is communication distance, f is frequency of signal, and c is speed of light.

For example, it may be a trend of the path loss rapidly reducing as the communication distance becomes closer, and the path loss rapidly increasing as the communication distance becomes more remote.

The processor 120, based on at least one of a size of the signal strength changing or a trend of the signal changing, may identify whether the strength of the signal falls within the second range. For example, the processor 120, based on the strength of the signal being equal to or greater than the predetermined size or the trend of the signal changing including a rapidly increasing Log form based on the electronic device 100 approaching the external device 200, may identify that the first section 410 falls within the second range. For example, the predetermined size may be 40 dB, but may include an error range. Further, the size predetermined in the first section 410 is a value according to movement of the electronic device 100 considering path loss and thus may be same or similar to the predetermined size of the signal strength changing according to movement of the electronic device 100 in the fourth section 440.

The processor 120 may then identify whether the strength of the signal received from the external device 200 in the second section 420 is equal to or greater than the predetermined threshold value. The processor 120, based on identifying that the strength of the signal received from the external device 200 is equal to or greater than the predetermined threshold value, may identify that the electronic device 100 and the external device 200 are placed in a state of relatively close proximity due to the electronic device 100 being in a state of being tagged or just before being tagged by the external device 200. Accordingly, the user may be determined as having the intention to perform a pairing between the electronic device 100 and the external device 200 in proximity with the electronic device 100, and thus the processor 120 may perform communication with the external device 200.

For example, the predetermined threshold value may be −10 dBm, but may include an error range. Thus, based on the strength of the signal received from the external device 200 reaching −10 dBm, the processor 120 may perform communication with the external device 200. The value related to the predetermined threshold value is to be noted as only one example.

The processor 120 may convert the electronic device 100 to a low power mode in the third section 430. Based on the electronic device 100 being converted to a low power mode, the strength of the signal may be reduced by the predetermined size. For example, the strength of the signal may be reduced by 40 dB and may include an error range.

The processor 120, based on the strength of the signal being reduced by the predetermined size according to the low power mode in the third section 430, may provide a guide UI guiding the electronic device 100 to separate from the external device 200. Since the above has been described in FIG. 5, a detailed description thereof will not be repeated here.

The processor 120, based on the electronic device 100 being separated from the external device 200 in the fourth section 440, may identify whether the strength of the signal falls within the first range based on at least one from the size of the signal strength changing or the trend of the signal changing. The first range may, for example, be a range including the third section 430 and the fourth section 440. For example, the first range may be determined based on degradation range of signal strength by the second range and the low power mode. The second range may, for example, be a range that is to be satisfied in the first section 410, and is prefaced by the predetermined size of the first section 410 being the same as the size with the predetermined size of the fourth section 440. The predetermined size of the first section 410 and the predetermined size of the fourth section 440 may be according to the movement of the electronic device 100 based on path loss, and in case the electronic device 100 moves the same distance, the predetermined size of the first section 410 and the predetermined size of the fourth section 440 may be the same. For example, the first range may be a 0-80 dB range totaling 40 dB (second range) and 40 dB (low power mode). However, such values include a predetermined error range and is to be noted as only one example, and the disclosure is not limited thereto.

The processor 120, based on the strength of the signal, which changes according to the electronic device 100 being separated from the external device 200, being equal to or greater than the predetermined size or the trend of the signal changing including a rapidly decreasing Log form, may identify the fourth section 440 as falling within the first range. For example, the predetermined size may be 40 dB.

The change in signal rapidly reducing may be attributed to path loss, which has been described above and thus a detailed description thereof may not be repeated here.

The processor 120, based on satisfying a predetermined condition from the first section to the fourth section 410 to 440, may perform a secure pairing operation with the external device 200. That is, based on the predetermined condition being satisfied from the first section to fourth section 410 to 440, the external device 200 transmitting a signal to the electronic device 100 may be identified as valid device and not an outside intruder, and thus the processor 120 may perform a secure pairing with the respective device.

Figure 6:
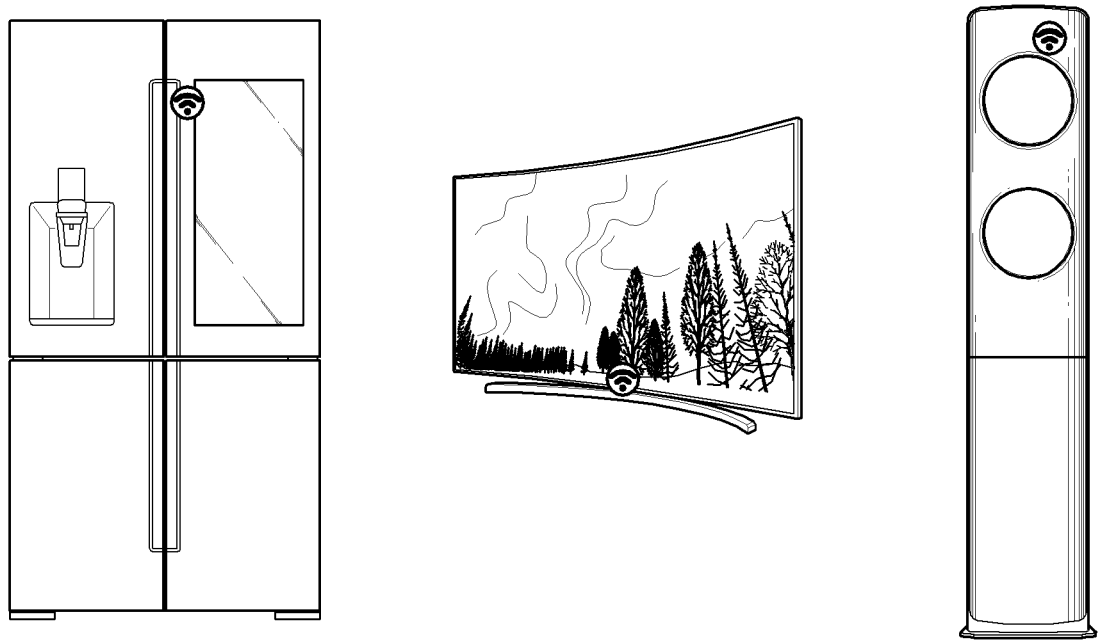
FIG. 6 is a diagram provided illustrating an example of an example electronic device approaching a region of an external device according to an example embodiment of the present disclosure.

FIG. 6 is a diagram illustrating an example of an electronic device approaching a region of an external device according to an example embodiment of the present disclosure.

FIG. 6 will be described assuming that the external device 200 is realized as a refrigerator, a TV, or an air conditioner. However, it will be understood that the disclosure is not limited thereto.

The external device 200 may be a device that includes a software AP. For example, the external device 200 may be a device capable of performing a software AP function. The strength of the signal measured from the electronic device 100 may be the strength of the signal transmitted from the software AP of the external device 200, and based on the electronic device 100 being in proximity with the software AP, the strength of the signal may be rapidly increased.

Accordingly, a region installed with the software AP is shown on the external device 200, and the user may easily move the electronic device 100 to be in proximity with or to tag the respective region of the external device 200. The region installed with the software AP may be shown in an antenna form indicating the strength of the signal, and the position shown with the antenna form along the position installed with the software AP may be changed. Further, the region may be shown not as an antenna form but in various forms such as a circular form.

FIG. 6 has been illustrated assuming the case of the external device 200 being realized as a refrigerator, a TV or an air conditioner, but is not limited thereto and may be realized in various other forms such as, for example, and without limitation, a dryer, an air purifier, a humidifier, a vacuum, a microwave, a washer or the like, and the respective devices may also show an antenna form.

The electronic device 100 may, for example, and without limitation, be a mobile device such as a smart phone, or the like, and the external device 200 may, for example, and without limitation, be a fixed device such as a refrigerator, or the like. Although not limited thereto, the electronic device 100 and the external device 200 may be realized as a mobile device or a fixed device, respectively.

Figure 3:
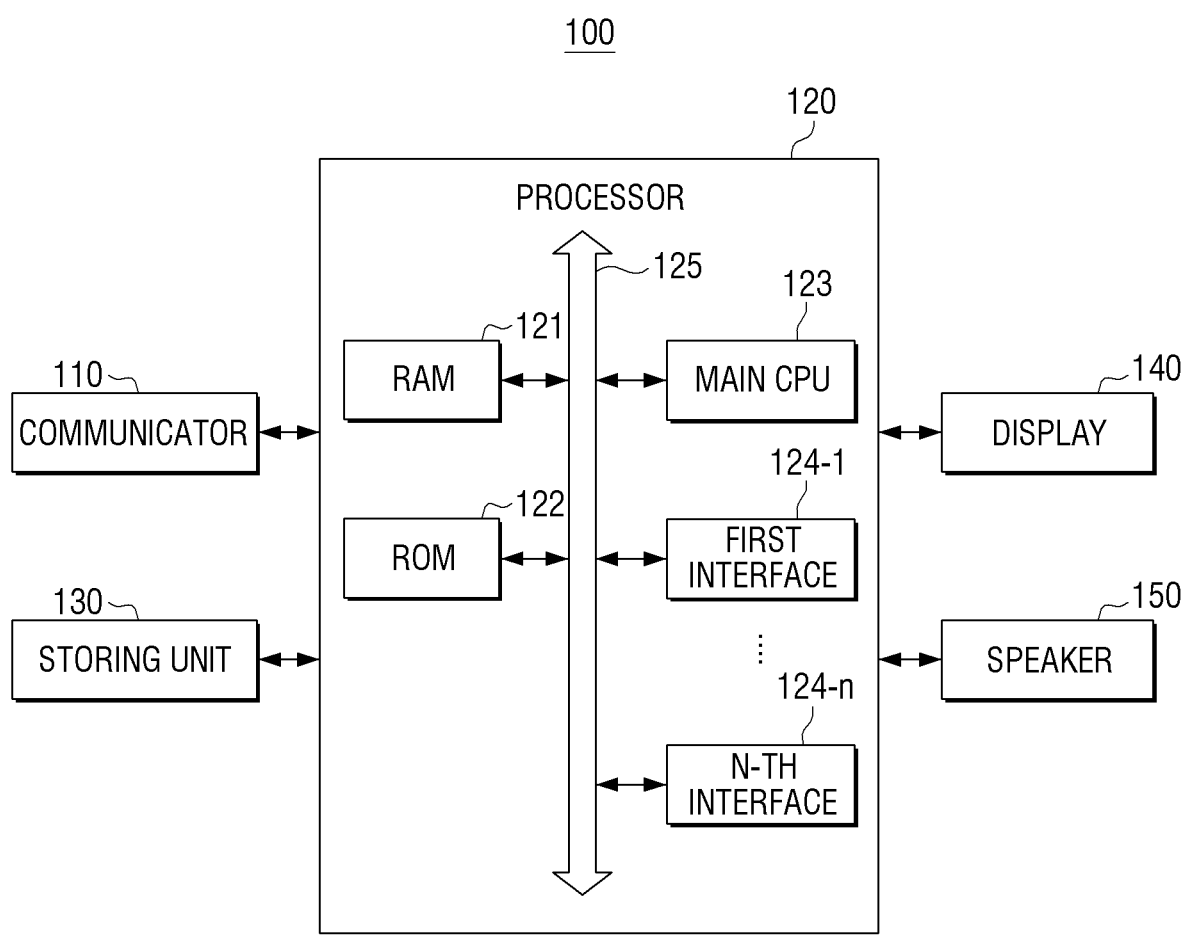
FIG. 3 is a block diagram illustrating an example configuration of an example electronic device according to an example embodiment of the present disclosure.

FIG. 3 is a block diagram illustrating an example configuration of an electronic device according to an example embodiment of the present disclosure.

Referring to FIG. 3, the electronic device 100 may include a communicator (e.g., including communication circuitry) 110, a processor (e.g., including processing circuitry) 120, a storing unit (e.g., a memory) 130, a display 140, and a speaker 150. From the components illustrated in FIG. 3, with respect to parts that overlap with the components illustrated in FIG. 2, a detailed description thereof may not be repeated here.

The communicator 110 may include various communication circuitry and may be configured to transmit and receive data with the external device 200. The communicator 110 may include various modules including various communication circuitry, such as, for example, and without limitation, a Wi-Fi module (not shown), a Bluetooth module (not shown), a Local Area Network (LAN) module (not shown), a wireless communication module (not shown), or the like. Each communication module may be realized in at least one hardware chip form. The wireless communication module, other than the communication methods described above, may include at least one communication chip including various communication circuitry for performing communication according to the size of the various wireless communication modules such as zigbee, 3rd Generation (3G), 3rd Generation Partnership Project (3GPP), Long Term Evolution (LTE), LTE Advanced (LTE-A), 4th Generation (4G), 5th Generation (5G) or the like. However, the above is merely an example embodiment, and based on the communicator 110 communicating with the external device 200, may use at least one communication module from the various communication modules.

The processor 120 may include various processing circuitry and control the overall operation of the electronic device 100 using the various programs stored in the storing unit 130.

For example, the processor 120 may include a RAM 121, a ROM 122, a main CPU 123, a first to n-th interface 124-1 to 124-n, and a bus 125.

A RAM 121, a ROM 122, a main CPU 123, a first to n-th interface 124-1 to 124-n and the like may be interconnected through a bus 125.

An instruction set and the like for system booting may be stored in the ROM 122. Based on a turn-on instruction being input and power being supplied, the main CPU 123 copies the O/S stored in the storing unit 130 to the RAM 121 according to the instructions stored in the ROM 122, execute the O/S to boot the system. Based on completing the booting, the main CPU 123 copies the various application programs stored in the storing unit 130 to the RAM 121, and executes the application programs copied to the RAM 121 to perform various operations.

The main CPU 123 accesses the storing unit 130, and performs booting using the O/S stored in the storing unit 130. Further, various operations are performed using the various programs, content data, and the like stored in the storing unit 130.

The first to n-th interface 124-1 to 124-n is connected to the various components described above. At least one of the interfaces may be a network interface connected to an external device through the network.

The storing unit 130 may be realized as an internal memory such as the ROM included in the processor 120 (for example, an electrically erasable programmable read-only memory (EEPROM)), the RAM, or the like, or as a separate memory from the processor 120. In this case, the storing unit 130 may be realized as an embedded memory form to the electronic device 100 based on data storage use or as a detachable memory form to the electronic device 100. For example, data for the driving of the electronic device 100 may be stored in a memory embedded t the electronic device 100, and data for the expansion function of the electronic device 100 may be stored in a detachable memory to the electronic device 100. The memory embedded to the electronic device may be realized as, for example, and without limitation, at least one of a volatile memory (for example: dynamic RAM (DRAM), static RAM (SRAM) or synchronous dynamic RAM (SDRAM), etc.)) or a non-volatile memory (for example: one time programmable ROM (OTPROM), programmable ROM (PROM), erasable and programmable ROM (EPROM), electrically erasable and programmable ROM (EEPROM), mask ROM, flash ROM, flash memory (for example: NAND flash or NOR flash, etc.), hard drive, solid state drive (SSD)), or the like, and the detachable memory to the electronic device 100 may be realized as, for example, and without limitation, a memory card (for example, compact flash (CF), secure digital (SD), micro secure digital (Micro-SD), mini secure digital (Mini-SD), extreme digital (xD), multi-media card (MMC), etc.), an external memory capable of connecting to a USB port (for example, a USB memory), or the like.

The display 140 may display various information. Specifically, the display 140 may provide a guide UI guiding the electronic device 100 to approach the external device 200 or to separate from the external device 200.

In addition, the display 140 may be realized in a touch screen form comprising an interlayer structure with the touch pad. In such a case, the display 140 may be used as a user interface (not shown) receiving user input other than as an output device. The touch screen may be configured to detect not just a position and an area of a touch input, but also a pressure of the touch input.

The display 140 may be realized in various forms such as, for example, and without limitation, a liquid crystal display (LCD), an organic light-emitting diode (OLED), a Liquid Crystal on Silicon (LCoS), a Digital Light Processing (DLP), a quantum dot (QD), a Micro light-emitting diode (Micro LED) display, or the like.

The speaker 150 is configured to provide a voice or sound. For example, the speaker 150 may approach the electronic device 100 to the external device 200 or may provide a guiding voice to separate from the external device 200.

Figure 7:
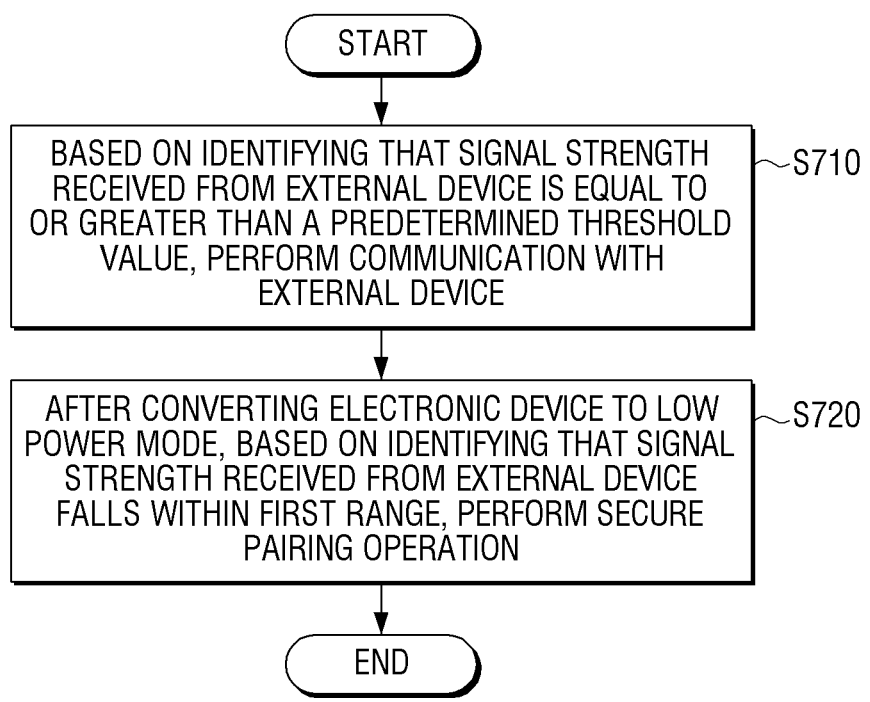
FIG. 7 is a flowchart illustrating an example method of controlling an electronic device according to an example embodiment of the present disclosure.

FIG. 7 is a flowchart illustrating an example method of controlling an electronic device according to an example embodiment of the present disclosure.

The electronic device 100, based on identifying that the strength of the signal received from the external device 200 is equal to or greater than a predetermined threshold value, may perform communication with the external device 200 S710.

The electronic device 100, based on the signal strength received from the external device 200 falling within the second range and identifying to be equal to or greater than the predetermined value at a particular point of time, may communicate with the external device 200 at a corresponding point of time. The predetermined threshold value may be −10 dB, and may include an error range.

The external device 200 may include a software access point (AP), and the electronic device 100, based on identifying that the strength of the Wi-Fi signal received from the external device 200 is equal to or greater than the predetermined threshold value, may perform a Wi-Fi communication with the software AP.

In addition, the electronic device 100, after converting to a low power mode and based on identifying that the strength of the signal received from the external device 200 falls within the first range, may perform a secure pairing operation S720. The first range may be determined based on a degradation range of signal strength by the second range and the low power mode. For example, the first range may be 0 to 80 dB, and may include an error range. For example, the electronic device 100, based on receiving a request signal including a first parameter used in a public key encryption from the external device 200, transmits a response signal including a second parameter to the external device 200, and based on identifying that the strength of the signal of the request signal falls within the first range, may perform a secure pairing operation based on the first parameter and the second parameter.

The electronic device 100 may generate a first secure key based on the first parameter and the second parameter, and may perform a secure pairing operation based on the generated first secure key and the second secure key generated from the external device 200. The second secure key, based on identifying that the strength of the response signal received from the external device 200 falls within the first range, may be generated based on the first parameter and the second parameter.

The display 140 of the electronic device 100, while bringing the electronic device 100 in proximity with the external device 200, after tagging the electronic device 100 to the external device 200, may provide a guide UI guiding the electronic device 100 to separate from the external device 200.

The electronic device 100 may be a mobile device, and the external device 200 may be a fixed device.

The detailed operations of each step have been described above and thus a detailed description thereof may not be repeated here.

Methods according to the various example embodiments of the present disclosure described above may be realized in an application form capable of being installed in conventional electronic devices.

In addition, methods according to the various example embodiments of the present disclosure described above may be realized as a software upgrade to conventional electronic devices, or just as a hardware upgrade.

In addition, the various example embodiments of the present disclosure described above may be performed through an embedded server equipped in an electronic device or an external server of at least one from an electronic device and a display device.

According to an example embodiment of the present disclosure, the various example embodiments described above may be implemented with software including instructions stored in the storage medium readable by a machine (for example, a computer). The machine, as a device capable of calling the stored instructions from the storage media and operating according to the called instructions, may include electronic devices according to the disclosed embodiments. Based on instructions being executed by the processor, the processor may directly, or using other components under the control of the processor may perform functions corresponding to the instructions. The instructions may include a code generated by a compiler or a code executable by an interpreter. The machine-readable storage media may be provided in the form of a non-transitory storage media, where the 'non-transitory' storage medium is tangible and does not include a signal. This term does not distinguish that data is permanently or temporarily stored in the storage medium.

In addition, according to an embodiment of the present disclosure, the method according to various embodiments disclosed herein may be provided in a computer program product. A computer program product may be exchanged between a seller and a purchaser as a commodity. A computer program product may be distributed in the form of a machine-readable storage medium (for example: compact disc read only memory (CD-ROM)) or distributed online through an application store (e.g. PlayStore™). In the case of online distribution, at least a portion of the computer program product may be stored temporarily or at least temporarily in a storage medium such as a manufacturer's server, a server of an application store, or a memory of a relay server.

In addition, according to an embodiment of the present disclosure, the various embodiments described herein may be realized in a computer or a similar device within a machine-readable storage medium using a software, a hardware, or a combination thereof. In some cases, embodiments described herein may be implemented by the processor itself. According to a software implementation, embodiments such as the procedures and functions described herein may be implemented with separate software modules. Each of the software modules may perform one or more of the functions and operations described herein.

The computer instructions for performing machine processing operations according to the various embodiments described above may be stored in a non-transitory computer-readable medium. The computer instructions stored in this non-transitory computer-readable medium cause a specific device to perform the processing operations of a device according to the various embodiments described above when executed by the processor of a specific device.

The non-transitory computer readable medium may include a compact disc (CD), a digital versatile disc (DVD), a hard disc, a Blu-ray disc, a universal serial bus (USB), a memory card, a read only memory (ROM), and the like.

In addition, each of the elements (for example, a module or a program) according to various embodiments may be composed of a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order, omitted, or may add a different operation.

While the present disclosure has been illustrated and described with reference to various example embodiments thereof, the present disclosure is not limited to the specific embodiments described. It will be understood by those skilled in the art that various changes in form and details may be made therein without departing from the spirit and scope of the disclosure.

What is claimed is:

1. An electronic device comprising:
    a communicator comprising communication circuitry; and
    a processor configured to:
    control the communicator to perform communication with an external device based on identifying that a strength of a signal received from the external device is equal to or greater than a predetermined threshold value;
    control the electronic device to convert to a low power mode after identifying that the strength of the signal received from the external device is equal to or greater than the predetermined threshold value, and
    control the electronic device to perform a secure pairing operation based on identifying, after converting to the low power mode, that a strength of a signal received from the external device is within a first range.

2. The electronic device as claimed in claim 1, wherein the processor is configured to control the communicator to transmit a response signal comprising a second parameter to the external device based on receiving a request signal comprising a first parameter used in a public key encryption from the external device through the communicator, and
    to control the electronic device to perform the secure pairing operation based on the first parameter and the second parameter based on identifying that a strength of a signal of the request signal falls within the first parameter.

3. The electronic device as claimed in claim 2, wherein the processor is configured to control the electronic device to perform the secure pairing operation based on a first secure key generated based on the first parameter and the second parameter and a second secure key generated from the external device, and
    wherein the second secure key is generated based on the first parameter and the second parameter, based on identifying that a strength of a signal of the response signal received from the external device is within the first range.

4. The electronic device as claimed in claim 1, wherein the processor is configured to control the communicator to perform communication with the external device at a corresponding point-of-time based on a strength of a signal received from the external device being within a second range and identifying that the strength of the signal is equal to or greater than the predetermined threshold value at a particular point-of-time.

5. The electronic device as claimed in claim 4, wherein the first range is determined based on a degradation range of signal strength by the second range and the low power mode.

6. The electronic device as claimed in claim 1, wherein the external device comprises a software access point (AP), and
    wherein the processor is configured to control the communicator to perform a Wi-Fi communication with the software AP based on identifying that a strength of a Wi-Fi signal received from the external device is equal to or greater than the predetermined threshold value.

7. The electronic device as claimed in claim 1, further comprising:
    a display;
    wherein the processor is configured to control the display to provide a guide UI guiding the electronic device to separate from the external device based on the electronic device being within a specified proximity of the external device and after tagging the electronic device to the external device.

8. The electronic device as claimed in claim 1, further comprising:
    wherein the first range is to be determined based on a degradation range of signal strength by the low power mode.

9. An electronic system including a first electronic device and a second electronic device, the electronic system comprising:
    the first electronic device configured to perform communication with the second electronic device based on identifying that a strength of a signal received from the second electronic device is equal to or greater than a predetermined threshold value, convert to a low power mode after identifying that the strength of the signal received from the second electronic device is equal to or greater than the predetermined threshold value, and to perform a secure pairing operation based on identifying, after converting to the low power mode, that a strength of a signal received from the second electronic device is within a first range; and
    the second electronic device is configured to perform a secure pairing operation based on performing communication with the first electronic device and identifying that a strength of a signal received from the first electronic device is within the first range.

10. The electronic system as claimed in claim 9, wherein the first electronic device is configured to transmit a response signal comprising a second parameter to the second electronic device based on receiving a request signal comprising a first parameter from the second electronic device, and to generate a first secure key based on the first parameter and the second parameter based on identifying that a strength of a signal of the request signal is within a first range, wherein the second electronic device is configured to generate a second secure key based on the first parameter and the second parameter based on receiving a response signal comprising the second parameter from the first electronic device and identifying that a strength of a signal of the response signal is within the first range, and wherein the first and second electronic devices are configured to perform the secure pairing operation based on the first secure key and the second secure key.

11. The electronic system as claimed in claim 9, wherein the first range is to be determined based on a degradation range of signal strength by the low power mode.

12. A method of controlling an electronic device comprising:

performing communication with an external device based on identifying that a strength of a signal received from the external device is equal to or greater than a predetermined threshold value;

converting to a low power mode after identifying that the strength of the signal received from the external device is equal to or greater than the predetermined threshold value; and performing a secure pairing operation based on identifying, after converting to the low power mode, that a strength of a signal received from the external device is within a first range.

13. The method as claimed in claim 12, wherein the performing the secure pairing operation comprises:

transmitting a response signal comprising a second parameter to the external device based on receiving a request signal comprising a first parameter used in a public key encryption from the external device, and performing the secure pairing operation based on the first parameter and the second parameter based on identifying that a strength of a signal of the request signal is within the first range.

14. The method as claimed in claim 13, wherein the performing of the secure pairing operation comprises:

performing the secure pairing operation based on a first secure key generated based on the first parameter and the second parameter and a second secure key generated from the external device, and wherein the second secure key, based on identifying that a strength of a signal of the response signal received from the external device is within the first range, is generated based on the first parameter and the second parameter.

15. The method as claimed in claim 12, wherein the performing the communication comprises performing communication with the external device at a corresponding point of time based on a strength of a signal received from the external device being within a second range and identifying that the strength of the signal is equal to or greater than the predetermined threshold value at a particular point-of-time.

16. The method as claimed in claim 15, wherein the first range is determined based on a degradation range of signal strength by the second range and the low power mode.

17. The method as claimed in claim 12, wherein the external device comprises a software access point (AP), and wherein the performing the communication comprises performing a Wi-Fi communication with the software AP based on identifying that a strength of a Wi-Fi signal received from the external device is equal to or greater than the predetermined threshold value.

18. The method as claimed in claim 12 further comprising:

providing a guide UI guiding the electronic device to separate from the external device based on the electronic device being within a specified proximity with the external device and after tagging the electronic device to the external device.

19. The method as claimed in claim 12, wherein the predetermined threshold value is −10 dBm, and wherein the first range is in a 0-80 dB range.

20. The method as claimed in claim 12 further comprising:

wherein the first range is determined based on a degradation range of signal strength by the low power mode.

* * * * *